Figure 3:
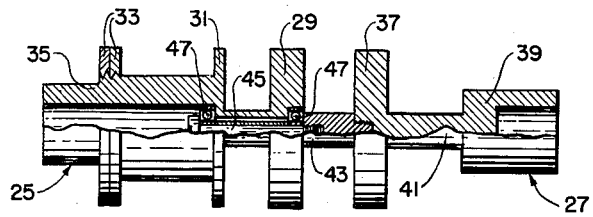

July 11, 1950  G. SHAPIRO  2,514,420
COUPLING
Filed March 19, 1946  2 Sheets-Sheet 1
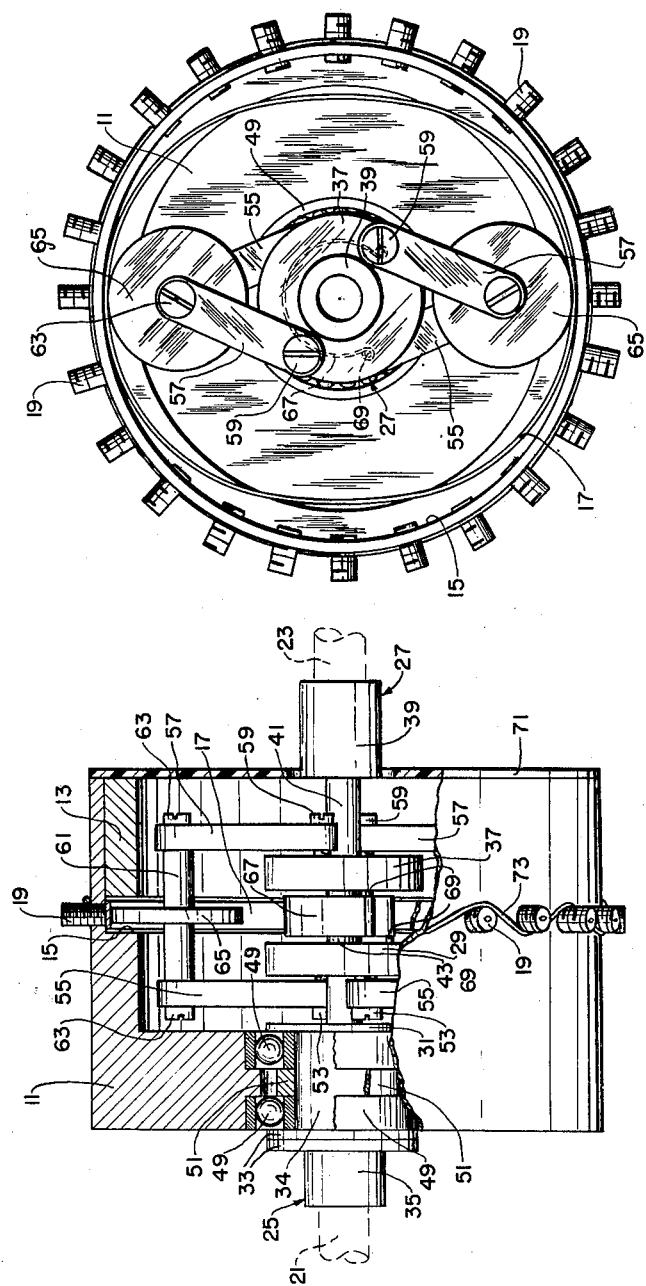
INVENTOR.
GUSTAVE SHAPIRO
BY
William D. Hall.
ATTORNEY July 11, 1950  G. SHAPIRO  2,514,420
COUPLING Filed March 19, 1946  2 Sheets-Sheet 2

*INVENTOR.*
GUSTAVE SHAPIRO

BY
William D. Hall.
ATTORNEY

Patented July 11, 1950

2,514,420

UNITED STATES PATENT OFFICE 2,514,420

COUPLING

Gustave Shapiro, Asbury Park, N. J.

Application March 19, 1946, Serial No. 655,541

3 Claims. (Cl. 74—63)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to couplings, and more particularly to couplings for joining two rotatable members together so that they may turn an equal number of revolutions over a period of time but may have different angular velocities at various times during their operation.

Needs have arisen, in connection with divers electronic devices, for a coupling means through which an output shaft may be rotated by an input shaft in such a manner that, if the input shaft has a constant angular velocity, the output shaft may have a variable angular velocity, and vice versa, and also, if the input shaft has a variable angular velocity, the output shaft may have a different angular velocity. It is also convenient that such a coupling means be readily adjustable so that a suitable relationship between the angular velocities of the two shafts may be accomplished by simple and rapid means, and preferably without the necessity of interchanging parts.

It is therefore an object of the present invention to provide an adjustable coupling means for two shafts which will transmit varying angular velocities therebetween.

It is also an object to provide such a means which is relatively small in size, light in weight and able to withstand relatively high angular velocities.

It is a further object to provide such a means which may be readily adjusted from the outside, making it unnecessary to take it apart or to remove it from its operating position.

It is still another object to provide an embodiment of such a means which may be adjustable through 180° without the use of external gearing means.

It is yet another object to provide another embodiment of such a means which is adjustable through 360° without the necessity of using external gears or the like.

It is another object to provide such a means which is reversible and is not subject to objectionable backlash in either direction.

It is still a further object to provide such a coupling means wherein the input and output shafts may be interchanged.

These and other objects of the present invention, which will be better understood as the detailed description progresses, are obtained in the following manner:

In a preferred embodiment, I provide means for joining the ends of two shafts together so that said shafts are coaxially disposed and are able to rotate individually. The inner end of a stiff cam arm is pivotably secured to each shaft, at an eccentric position thereof. The outer ends of said arms are in turn pivotably secured to each other through a cam follower. Thus it will be seen that a cam linkage is formed so that, if the cam follower is moved inwardly toward the axis of the shafts, the inner ends of the two cam arms will move further apart so as to cause relative rotation between the shafts and, if the cam follower is moved outwardly away from the axis of the shafts, the shafts will also be caused to rotate relative to each other but in opposite directions to those when the follower is moved inwardly. Spring means are also provided to urge the cam follower outwardly away from the axis of the shafts.

I further provide a cam to guide the cam follower inwardly and outwardly so as to obtain a desired relationship between the angular velocities of the two shafts. Said cam may of course be of fixed configuration and other cams of other configurations may be interchanged for said cam to obtain other relationships. However, my invention further provides for a cam which is a flexible strip and which is given a desired configuration by suitable adjusting means. Thus said adjusting means may be operated to give the said cam strip any one of a plurality of configurations to suit different purposes. Although the cam illustrated in the drawings is given suitable configurations by adjusting means which are merely screw-threaded members extending through a housing, any other suitable adjusting means may be substituted.

In the accompanying specification there are described, and in the annexed drawings shown, what are at the present time considered preferred embodiments of my present invention. It is however to be understood that my present invention is not limited to said embodiments but may well be incorporated in other embodiments and utilized in many applications.

Figure 4:
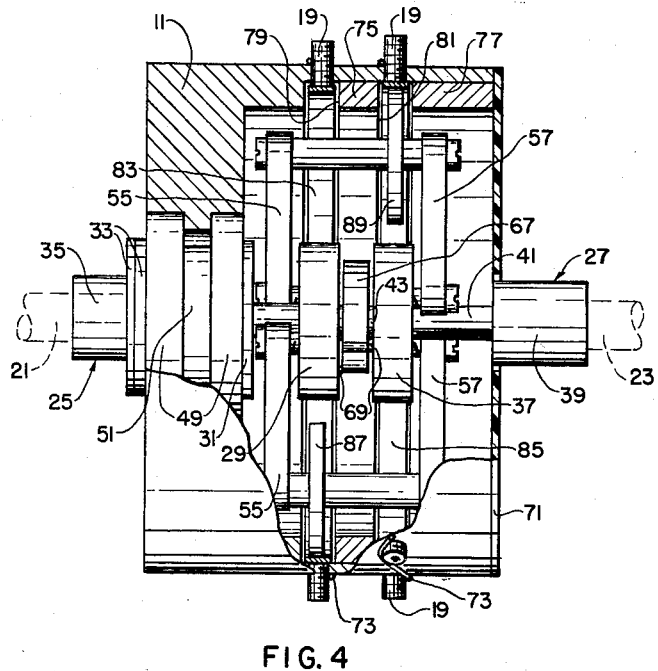

In said drawings, Figure 1 is an elevational view, partly cut away and sectioned vertically through the axis, of a coupling embodying the present invention, wherein adjustment of angular velocity through a 180° cycle is possible;

Figure 2 is a view, from the right side of Figure 1, with the housing ring and cover plate removed to expose the interior;

Figure 3 is an elevational view similar to Figure 1, partly cut away and partly sectioned vertically through the axis, but illustrating only one form of central assembly for connecting the input and output shafts so that they are maintained concentrically and rotatable relative to each other; and Figure 4 is a view similar to Figure 1 of a modified form of coupling wherein variation of angular velocity through a 360° cycle is possible.

Referring now more particularly to the drawings, the preferred form of coupling illustrated in Figures 1–3 includes a generally cylindrical, cup-shaped housing 11. A housing ring 13 nests snugly within the open end of said housing 11 so as to form a cam channel 15 extending around the inner surface of said housing 11. A plurality of cam adjusting screws 19 are positioned radially through the wall of the housing 11 so that their inner ends may extend into the cam channel 15 and may act as a limiter for outward movement of a cam strip 17.

The said cam strip 17 is loosely positioned in the said cam channel 15 and is a ring of flat flexible material, preferably metal, which is of lesser perimeter than the perimeter of the channel 15 and preferably of no greater perimeter than the perimeter of a smooth curve connecting the inner ends of all of the adjusting screws 19 when they are screwed inwardly to their innermost operating positions.

The spaced ends of an input shaft 21 and output shaft 23 are joined together coaxially by a central assembly (see particularly Figure 3) which includes an input member 25 and an output member 27.

Said input member 25 is generally tubular but is of several different outside diameters and inside diameters along its length. Its inner end terminates in an input disk 29. Further outward (to the left in Figure 3) it is provided with an outwardly extending clamping flange 31. Still further outwardly and spaced from the said flange 31, it is externally threaded and is receivable to a pair of clamping nuts 33. Intermediate said flange 31 and nuts 33 the input member 25 is provided with a cylindrical bearing surface 34. The outer end of said input member 25 terminates in a tubular input ferrule 35 within which the end of the input shaft 21 may be positioned. Said shaft 21 may be secured therein by any conventional means (not shown) such as a set screw and key.

The output member 27 is made up of an output disk 37, which is at its inner end, and a coaxially disposed, tubular output ferrule 39 at its outer end, said disk 37 and ferrule 39 being spaced from each other and joined by a short length of coaxially disposed rod 41.

The input and output disks 29, 37 are spaced from each other and are coaxially disposed by a spacer 43. Said spacer 43 is a short length of rod provided with an externally threaded axial peg at one end, threaded into the output disk 37, and with an internally threaded axial cavity at its other end, receivable to the threaded end of a bearing bolt 45 which extends axially through the input member 25. The bearing bolt 45 is sustained coaxially and rotatably within the input member 25 by means of a pair of annular ball bearings 47 which surround said bolt 45 and are disposed within said input member 25.

The entire central assembly (as shown in Figure 3), including the input and output members 25, 27, is rotatably sustained within the housing 11 by means of a pair of annular ball bearings 49 which encircle the bearing surface 34 described above (see Figure 1). An annular spacer ring 51 is positioned between the inner races of the bearings 49 and said inner races and said ring 51 are clamped together between the clamping flange 31 and the clamping nuts 33.

The inner ends of two stiff input cam arms 55 are pivotably secured, by means of screws 53, to the input disk 29, at diametrically opposite points thereof. Two similar output cam arms 57 are similarly secured to the output disk 37 by means of screws 59. The outer ends respectively of one of the input cam arms 55 and one of the output cam arms 57 are pivotably joined by a rotatable roller shaft 61 and bolts 63. Said roller shaft 61 is parallel to the axis of the input and output members 25, 27. A cam roller 65 is fastened to the roller shaft 61 and is positioned to be centered in the channel 15. The second input cam arm 55 is likewise pivotably joined to the second output cam arm 57 by a second roller shaft 61 provided with a second cam roller 65.

The two cam rollers 65 are at all times urged outwardly away from the axis of the members 25, 27, by means of an arcuate spring 67 which is disposed about the spacer 43 and has its opposite ends pinned respectively to the input and output disks 29, 37 by means of spring pins 69. The rollers 65 are adapted to roll on the cam strip 17 mentioned above.

The open end of the housing 11 is provided with a circular cover plate 71 which may be of plastic or any other suitable material and which is pierced centrally by an opening through which the output member 27 extends.

The cam adjusting screws 19 are retained in any desired position to which they are adjusted by means of a locking wire 73 which encircles the housing 11 and passes on opposite sides of successive screws 19 so as to frictionally grip each of them.

In the operation of the coupling just described, an input shaft 21 is secured into the input ferrule 35 and a coaxially disposed output shaft 23 is secured into the output ferrule 39. Assuming that all of the cam adjusting screws 19 are in their outermost positions, so that their inner ends do not extend into the channel 15, rotation of the input shaft 21 will result in synchronous rotation of the output shaft 23. In such operation the spring 67 will cause the rollers 65 to be in their outermost positions at all times and hence the two disks 29, 37 will rotate together in synchronism. The rollers 65 will press outwardly against the cam strip 17 where they make contact with it and will hold said strip against the inner ends of the adjusting screws 19.

However, should some of the cam adjusting screws be screwed inwardly, the cam strip 17 will likewise be moved inwardly by them, thus forcing the rollers 65 inwardly when they pass over such inwardly positioned portions of the said cam strip. Such inward positioning of the rollers 65 results in relative rotation in opposite directions of the input and output disks 29, 37 against the pressure of the spring 67. Thus it is seen that, if the cam adjusting screws 19 are adjusted in some predetermined manner (as shown for instance in Figure 2), they will cause the rollers 65 to move inwardly and outwardly as they ride along the cam strip 17 in the channel 15. This will cause the output shaft 23 to rotate with varying nonsynchronous angular velocities relative to the rotation of the input shaft 21. The cam adjusting screws 19 will be maintained in any position to which they are adjusted due to the pressure of the wire 73.

It will be noted that, although the cam strip 17 is of less perimeter than the channel 15, the rollers 65 will always be able to ride as far outwardly as allowed by the adjusting screws 19 as the cam strip 17 need only be in contact with said screws 19 at two diametrically opposite portions thereof and the intermediate portions of said cam strip 17 may be pulled inwardly to form a cam of generally oval configuration. It will thus be seen that the said cam strip 17 will be suitable for large variations of the various adjusting screws 19. The purpose of the cam strip 17 is merely to provide a smooth path for the rollers 65 as they pass from one screw 19 to another. If said screws 19 are close enough together, the cam strip 17 may be eliminated entirely.

Relative rotational movements of the input and output members 25, 27 are possible as said members are coupled together through the ball bearings 47.

Although one roller 65 and its linkage is sufficient to operate the coupling just described, smoother operation is obtained and inherent balancing is achieved by providing two such rollers and their respective linkages. This however limits the coupling of Figures 1–2 to cycles of variation in angular velocity of not more than 180°, as the adjusting screws 19, on opposite halves of the housing 11, must be similarly positioned to simultaneously cooperate with the two cam rollers 65.

Adjustment through cycles of 360° is possible however in the modified form of my invention shown in Figure 4. This modified form is similar to the simpler form already described (Figures 1–3) except that two housing rings 75, 77, spaced from each other, are provided (in place of the single housing ring 13 of the first described form). This forms two channels 79, 81 (instead of the single channel 15 of the first form). Each of said channels 79, 81 is provided with a cam strip 83, 85 (similar to the cam strip 17) and with two circles of cam adjusting screws 19 and two locking wires 73. Two cam rollers 87, 89 (similar to the rollers 65 already described above) are offset so that one rides in the channel 79 and the other in the channel 81.

The operation of the modified coupling of Figure 4 is similar to that already described (in connection with Figures 1–3) except that the screws 19 of one channel 79 may be adjusted for a variation cycle extending through 360°. The screws 19 of the other channel 81 are then adjusted for the same 360° cycle, but are 180° out of phase. Then, the rollers 87, 89 are caused to be moved in and out synchronously although riding in two different channels 79, 81.

It will be noted that, although the input member 25 is rotationally supported relative to the housing 11 by means of the bearings 49, similar bearings are not provided to support the output member 27. This is merely because the particular embodiments illustrated in the drawings are designed for operation with an output shaft 23 which is fitted with suitable bearings (not shown) located proximately to the output ferrule 39, and hence additional bearings within the coupling itself are unnecessary. In all embodiments, however, it is preferable that suitable bearing means be provided either inside or outside the coupling for rotational support of both the input and output members 25, 27 so as to avoid strain upon the bearing bolt 45 and associated parts, and to avoid whipping at high speeds. Also some suitable means (not shown) to sustain the housing 11 and keep it from rotating should be provided.

The present invention, being inherently balanced and having a minimum of reciprocating motion, is capable of withstanding relatively high angular velocities, which is requisite in some applications. Also it will be noted that, by the use of the cam strip 17 and other features incorporated into the design of the present invention, the coupling is reversible, it operates with a minimum of backlash in both directions, and either of the members 25, 27 may be used for input or output.

Examples of the use of the present invention are as follows: for ganging potentiometers or other electrical components when they can not be manufactured to close enough tolerances to fit the requirements of a particular electronic or timing apparatus, for driving a potentiometer, capacitor, etc., where particular cycles of variation are needed, for driving a linear device nonlinearly, for driving a nonlinear device linearly, for translating a rotational movement of nonlinear angular velocity into a rotational movement having a different nonlinear angular velocity, etc.

Although in the foregoing embodiments couplings have been described and illustrated which allow relative variations of angular velocity through cycles of 180° and 360°, the input and output shafts making a like number of revolutions per unit of time, it will be understood that cycles through other angular distances may be obtained, as well as inputs and outputs of different numbers of revolutions per unit of time, by suitable combinations of speed changing mechanisms (such as gear trains) which are well known in the art.

For instance, if an input shaft 21 has a constant angular velocity and it is desired to operate the output shaft 23 through a cycle of angular velocity variation extending over three revolutions, or 1080°, and to have the output shaft 23 rotate the same number of revolutions per unit of time as the input shaft, it might be accomplished by interposing a three to one step-down speed changing mechanism between the input shaft 21 and the input member 25 (of the form of invention shown in Figure 4) and interposing a one to three step-up speed changing mechanism between the output member 27 and the output shaft 23.

The operation then is as follows: for each three revolutions, at a constant angular velocity, of the input shaft 21, the input member 25 (by means of the step-down mechanism) makes a single revolution at a constant angular velocity. The output member 27 then makes one revolution for each revolution of the input member 25 and passes through one cycle of variation in angular velocity during each such revolution, or through each 360°. The three to one step-up mechanism then triples the number of revolutions but does not affect the number of cycles of variation in angular velocity per unit of time. Thus the output shaft 23 makes three revolutions for each single revolution of the output member 27 but only passes through one cycle of angular velocity variations while making said three revolutions. Hence the said cycle extends over 1080°. The output shaft 23 makes three revolutions while the input shaft 21 is making three revolutions; therefore the number of revolutions per unit of time is the same for both of said shafts 21, 23.

If it is desired to speed up the revolutions per period of time by 50% and also extend a cycle of variations in angular velocity over three revolutions, or over 1080°, this may be accomplished by interposing a two to one step-down speed changing mechanism between the input shaft 21 and the input member 25 and a one to three step-up speed changing mechanism between the output member 27 and the output shaft 23.

The operation then is as follows: for every six revolutions, of constant angular velocity, of the input shaft 21, the input member 25 (due to the step-down mechanism) makes three revolutions, of constant angular velocity. The output member 27 then makes three revolutions for each three revolutions of the input member 25 and said output member 27 passes through three cycles of variations in angular velocity during said three revolutions. The output shaft 23 then makes nine revolutions for each three revolutions of the output member 27 (due to the step-up mechanism) but only passes through three cycles of angular velocity variations during said nine revolutions, or one cycle for each three revolutions, or 1080°.

Thus it is seen that for every six revolutions of the input shaft 21 (at a constant angular velocity), the output shaft 23 makes nine revolutions, an increase of 50% (with a cycle of variations in angular velocity extending over 1080°).

Although in the illustrations set forth above, it was assumed that the input shaft 21 had a constant angular velocity, it will be understood that the present invention may also be used when the input shaft has a variable angular velocity.

It will be understood that, although in the embodiment shown the cam strip 17 is outside the rollers 65 and the spring urges said rollers against said cam strip, the invention is broad enough to include other cam and cam follower arrangements. For instance, a cam might be positioned inside the path of a cam follower, so that the follower would cooperate with the outer perimeter of said cam, and spring means would urge the cam follower inwardly toward said cam.

Certain specific forms of the invention have been described and illustrated as examples. The invention, however, is to be limited only by the scope of the appended claims.

What is claimed is:

1. In a coupling for joining an input shaft to an output shaft, a cup-shaped housing having a substantially cylindrical wall and a base, the cylindrical wall provided with an inner channel and the base pierced by an axial hole, an input member rotatably positioned through said hole, said input member provided with an input ferrule receivable to said input shaft and an input cam arm pivotably secured eccentrically to said input member, an output member rotatable relative to said input member, said output member provided with an output ferrule receivable to said output shaft and an output cam arm pivotably secured eccentrically to said output member, a cam follower shaft pivotably joining said cam arms, a cam follower secured to said cam follower shaft, a flexible cam strip positioned at least partly in the channel, a plurality of cam adjusting screws extending through the housing into the channel to limit outward movement of the cam strip, and spring means to keep the cam follower in operative engagement with the cam strip.

2. In a coupling as defined in claim 1, wherein there are a second pair of similar cam arms, a second similar cam follower shaft and a second similar cam follower cooperable with the cam strip, said cam followers being disposed on opposite sides of the input and output members.

3. In a coupling as defined in claim 1, wherein there are a second pair of similar cam arms, a second similar cam follower shaft, a second similar channel, a second similar cam strip, a second similar cam follower, a second set of cam adjusting screws, the said cam followers cooperable respectively with the cam strips in the two channels.

GUSTAVE SHAPIRO.

REFERENCES CITED

The following references are of record in the file of this patent:

UNITED STATES PATENTS

| Number | Name | Date |
| --- | --- | --- |
| 1,968,945 | Howie | Aug. 7, 1934 |
| 2,180,766 | Pearson | Nov. 21, 1939 |
| 2,230,363 | Pash | Feb. 4, 1941 |
| 2,409,130 | Lear | Oct. 8, 1946 |

FOREIGN PATENTS

| Number | Country | Date |
| --- | --- | --- |
| 102,169 | Austria | Dec. 28, 1925 |